Patented Oct. 28, 1941

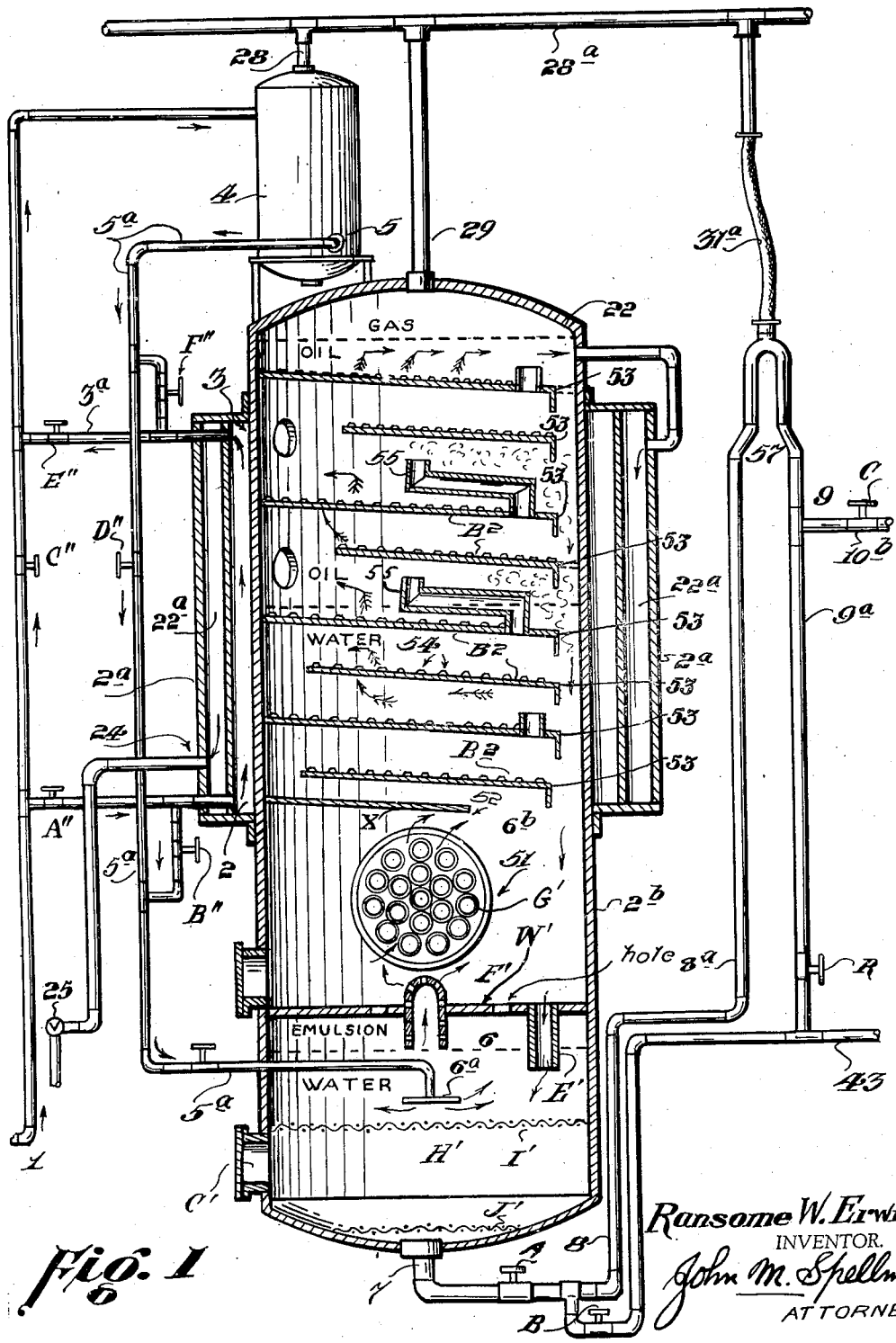

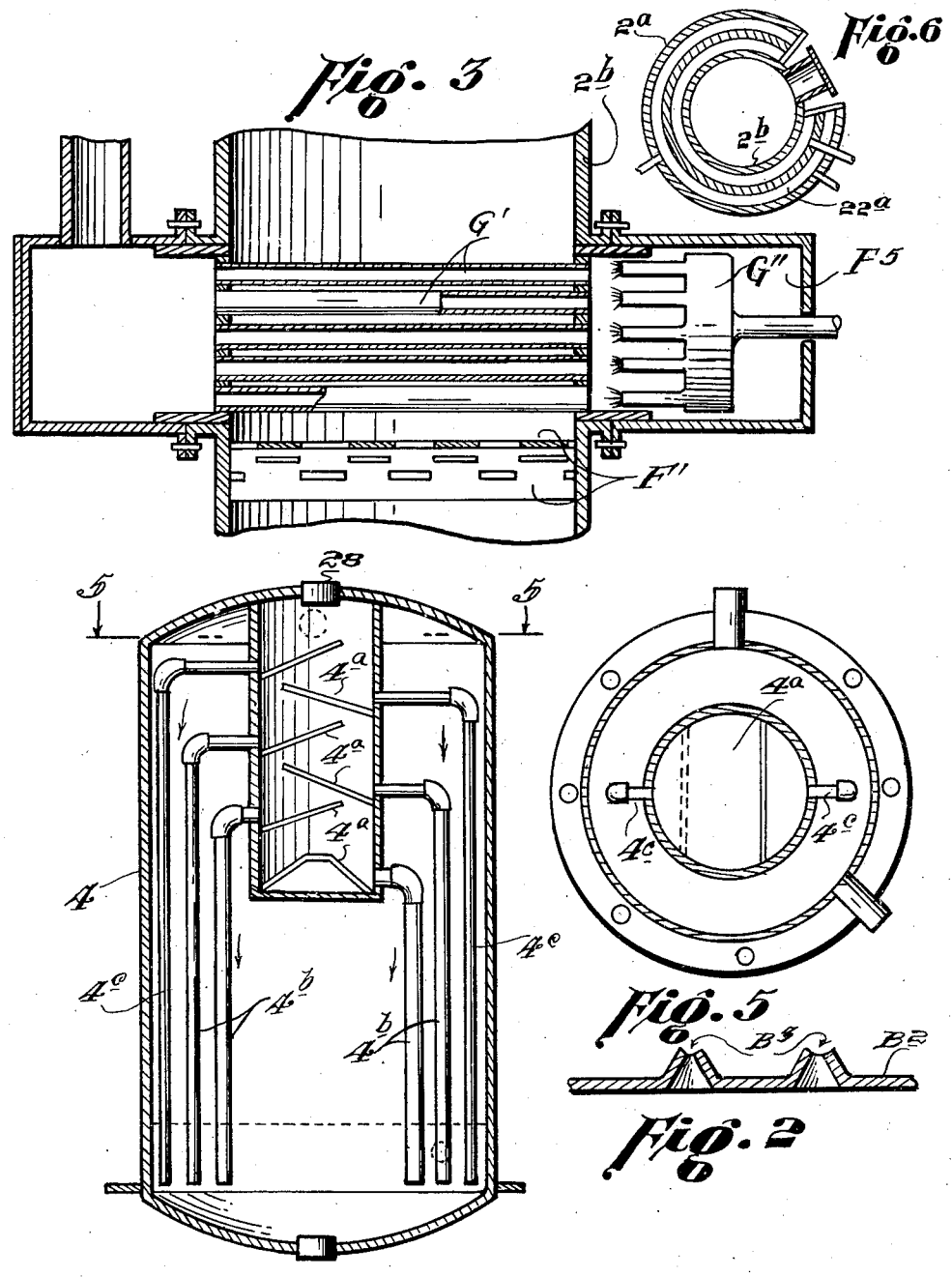

2,261,101

UNITED STATES PATENT OFFICE 2,261,101

EMULSION TREATING APPARATUS

Ransome W. Erwin, Longview, Tex., assignor to Salt Water Control Inc., Fort Worth, Tex., a corporation Application July 25, 1941, Serial No. 404,095

13 Claims. (Cl. 252—362)

This invention relates to improvements in emulsion treating systems for oil wells.

A combined emulsion treating and brine injection system for oil wells is claimed in my application Ser. No. 345,688 filed July 15, 1940, and a combined emulsion treating and brine disposal method is described and claimed in my application Ser. No. 404,094, filed July 25, 1941. The present apparatus may or may not be used in connection with the system and method of these applications, when considered in their broadest aspects.

One of the primary objects of the invention is the provision of emulsion treating apparatus in which the long-used and well-established principles of heat treatment, hot water washing, baffling, dispersion, excelsior filtering, metal-walled heat exchange between two liquids, and timed settling are utilized to break oil-water emulsions in the petroleum as it flows or comes from a well. A further object is to remove the water from the oil, once it is broken from the emulsion state, and to deliver the oil containing less than 1.0% emulsion or salt water to stock tanks, the oil being cooled as much as possible within the economical bounds of normal heat exchange methods. A further object is to automatically discharge the treated-out water from the system in a substantially oil-free and clean condition. According to my invention all of the above operations are preferably carried out with the use of a minimum quantity of fuel and emulsion breaking chemicals, as well as with a minimum of attention and maintenance. A further object is to accomplish the preceding operations with a pressure of at least 20 pounds per square inch on the whole system, and to exclude air, oxygen, algae, bacteria, and any other atmospheric agency from the system (or to do the same with as much as 5 inches of vacuum on the system.)

A further object of the invention is to maintain maximum A. P. I. gravity of the oil possible under conditions of heating and washing, and to salvage all weathered vapors from the system by returning them to the casing head gasoline plant's vacuum line.

The invention also contemplates the use of a gas separating chamber in association with the emulsion treating apparatus or equipment for the purpose of separating gases and liquids as thoroughly as is possible, the gas being returned to casing head plant's gathering vacuum line, and a gas-free mixture of oil, salt water and emulsion being delivered to a treating system for further processing.

With the above and other objects in view, the invention will be more readily understood from a perusal of the following detailed description, taken in connection with the accompanying drawings which are intended as illustrative of the inventive thought involved.

In the drawings:

Figure 1 is a vertical sectional view of the emulsion treating chamber or tank, showing also the removable gas separating chamber, both chambers being connected into the flow line of the system;

Figure 2 is a sectional detail view of one of the baffles of special design employed in the emulsion treating chamber;

Figure 3 is a detailed fragmentary vertical sectional view of the fire box and flues in the lower part of the emulsion treating chamber, the section being at right angles to the section in Figure 1; also showing battery of individual burners for each flue;

Figure 4 is a vertical sectional view of the gas separating chamber, shown in Figure 1;

Figure 5 is a cross-sectional view of the gas separating chamber on line 5—5 of Figure 4; and Figure 6 is a cross-sectional view of main emulsion treating tank showing the extent of the jacket circumference and excelsion section man ways.

In accordance with the drawings and referring particularly to Figure 1, a mixture of oil, water, emulsion and gas enters the system directly from the well through the pipe 1. The piping arrangement as shown in Figure 1 permits two possible schemes of operation pertaining to use of inner annulus 2 of heat exchange jacket 2a. Operation 1 would be thusly: with valves C″, B″ and F″, open and valves A″, D″ and E″ closed, the fluid from wells at pipe 1 would pass up through valve C″ on into oil and gas separating chamber 4, by-passing annulus 2. Then the gas free fluid would leave separator 4 at 5, coming down through pipe 5a, through valve F″ and into annulus 2 at top. It would leave annulus 2 near bottom going through valve B″, through pipe 5a and on into chamber 6 through spreader 6—a. In this case the fluid is not preheated before it enters gas separator 4.

Operation 2 would be thusly: Valves A″, D″ and E″ are open while valves C″, B″ and F″ are closed. Fluid from well at 1 goes through valve A″ into bottom of annulus 2 of heat exchange jacket 2a. It goes around and up jacket and out at 3 through valve E″, whence it goes on up and into oil and gas separating chamber 4, being slightly preheated at this point. It leaves separator 4 at point 5, goes down through pipe 5a, through valve D" on down pipe 5a into chamber 6 through spreader 6a.

The function of the oil and gas separating chamber is thus: The mixture passes into an oil and gas separating chamber 4, the arrows indicating the direction of flow. Here the gas is scrubbed from the oil and completely separated by the specially constructed baffles 4—a, shown in Figure 4, which allows oil droplets scrubbed from the gas to work down the upward side of each baffle, being driven along by the gas down into the lower recess that leads into the pipes 4—b. The pipes 4—c are of smaller diameter. These pipes drain the oil down beneath the surface level of the oil in the bottom of the separating chamber 4. The gas leaves the separating chamber through an outlet 28 at the top, where it enters the gasoline plant's vacuum line 28—a.

Resuming the course of the fluid as it enters spreaders 6a at bottom: In either case the mixture flows into the bottom of the emulsion tank 2—b where it enters a free water-removing and heat-salvaging chamber 6 through a spreader 6—a of any preferred type. The element 6—a spreads the oil, emulsion and water out, enabling it to intermingle with the hot water from the hot treating chamber 6—b above, the heat and spreading bringing about the removal of a considerable portion of the free water contained in the oil. This free water, together with the water treated out of the oil in the upper chamber, by heating and baffling, then passes through a filter section indicated at H' and makes its exit at the outlet 7, whence it passes through pipes 8 and 8—a to an adjustable syphon indicated at 57. The purpose of the filter section is to completely purge the water of all oil before leaving the tank. If it is desired to bypass this syphon for any reason, and send the water directly to an auxiliary pit, then valve B and valve A should be opened. If the water is to pass upwardly through the pipe 8—a to the syphon 57, then the valve A should be opened and valve B be closed. If the water is to go through the syphon and then to the pit, rather than into a water injection system, then a valve C in the outlet pipe 10—b should be closed, the water leaving at point 9, through the pipe 9—a, and passing downwardly to the pipe 43 through an open valve R. If the water is to go into an injection system, then the valve R must be closed and the valve C opened.

Referring again to the course of the oil, the mixture of oil or emulsion, in addition to what water failed to settle out in the free water removing and heat salvaging zone 6, leaves this zone travelling upwardly because it is lighter than the surrounding water, and accumulates beneath a partition W' which feeds it into a spreader F", Figures 1 and 3. By having the spreader F' project downwardly about 18 inches as shown, an 18 inch layer of oil is formed under the partition W', thus delaying the departure of untreated oil from the free water removing chamber, thereby giving it more time and opportunity to allow more of the free water to fall from it before it leaves this lower chamber. This layer of oil also acts as an insulator between the heating chamber 6—b and the lower chamber 6, any heat that is conducted through the partition W' to the oil being kept in the oil and later utilized for treating the oil when it reaches the hot treating section above. Then it passes through a battery of fire tubes G', at the point 51, thence upwardly to the plate X which acts to temporarily check the movement of the oil, allowing it to be longer contacted with hot water thus permitting more of free water to settle out of the mixture.

From this point the oil moves upwardly over the edge of the plate X at 52, whence it is introduced to a series of specially perforated and arranged baffles, indicated at B₂. These perforated baffles include punctured teat-like projections B—3 (see Figure 2) and part of the oil passes through these perforations as shown at point 54, all along the baffles, the excess not handled by the perforations moving on upwardly and out at the upper ends of the baffles. Once through the baffles, the oil is broken into fine streamlets that promote the breakage of the emulsion and removal of water from the oil (with the aid of emulsion-breaking chemicals if necessary or desirable). The oil then strikes the next plate or baffle above, similarly perforated, but which dips downwardly, acting to hold or check excess oil as was done by the first baffle, the surplus not handled by the perforations passing downwardly and out and up through conduit pipe 55 where it is introduced into the midst of a mass of excelsior or like material contained in this section and in the section above it for the purpose of breaking up the remainder of the emulsion and removing remainder of the free water contained in the oil. It should be noted that the special arrangement of perforations in the baffles in unique for the purpose so far as the inventor is aware, and allows the oil to move upwardly through them at all points on the baffles, thereby insuring thorough introduction of oil into excelsior sections which is conducive to thorough removal of free water from the oil, at the same time being designed so that water cannot flow counter-currently back through the perforations, against the oncoming stream of oil. Thus the water, indicated by the non-feathered arrows, works its way back down between the streamlets of oil from the perforations, on down onto the top side of the baffles, where it is able to gravitate down the upper side of the baffles on the space between the special perforations and down and over bent edge of plate at the point 53 which introduces it into the downward water passage, at the edge of the tank, the bent down edges of the baffles preventing counter-current flow of oil upwardly against the water. The feathered arrows indicate the course of the oil.

By the arrangement above described the oil is reduced to 1.0% or less water and emulsion by the time it reaches the outlet point 22 near the top of the tank whence it flows by gravity down into the outer shell or annular space 22—a of the heat exchange jacket 2—a. The oil passes down this annular space of the outer shell of the heat exchanger giving up its heat to the incoming fluid in the inner shell, completely around the shell and passes out at the point 24, then down into the level control valve 25 which automatically keeps outer jacket full of leaving-treated oil. The oil then flows from the valve 25 to stock tanks. The water removed from the oil in the perforated baffle section flows downwardly through the conduit pipe E' in the partition W' or by an outside pipe connection if desired, where it mingles with incoming untreated fluid in the free water removing and heat salvaging chamber 6. Thus are the gas, oil, emulsion and water handled in the emulsion treating system.

Any sand, mud or other insoluble matter that may be contained in the incoming fluid entering the chamber 6 through spreader 6—a will be deposited on top of the screen I' and in filter section H'. Screen J' keeps the filter medium from being carried out with the water from the system. A manhole C' is provided for the purpose of permitting access to section H'.

Any weathered vapors that the oil will not hold at the operating temperatures and pressures of the treating system are drawn off from the top of tank 2—b at 29 and salvaged by the vacuum line 28—a of the casing head gasoline plant. The adjustable syphon 57 is equalized with the gas pressure in the treating system by means of a flexible connection 31—a. This syphon maintains a predetermined desired oil-water level in the treating system.

It should be noted that the jacketed shell heat exchanger and insulator, the free water removing and heat salvaging chamber at the bottom of the unit 2—b and the oil and gas separator chamber on top of the unit while desirable, are not absolutely essential to the successful operation of the treater proper, even though they greatly enhance its operation; and all or any of these may be omitted if the purchaser of the equipment should see fit, using equipment already on hand for these functions.

The system is preferably composed of units made from rolled steel plates of suitable thickness for the required working pressure, and welded according to A. P. I.-A. S. M. E. specifications. All the valves in the system are or may be standard working pressure valves, and the fittings and piping are also preferably of standard make.

The heating arrangement of the system offers advantages over other closed type systems in that the fire tube units G' are of preferably sufficiently small dimensions as to enable their easy removal and replacement in case of individual failure without having to remove the entire battery of tubes, without resorting to hazardous welding, since the tubes are rolled in as in most boilers. The improvement arrangement provides maximum economy in labor and materials. Also this tube arrangement provides easy removal of soot from the tubes, simply by swabbing with a brush from the outside. A battery of Bunsen type burners G'' as shown in Figure 3, in front of tubes A' provides an individual burner for each flue, thereby eliminating any need of firebrick liners or targets, and also assuring that each tube receives its own share of the heat regardless of draft conditions varying in different tubes. This gives a more uniform distribution of heat and prolongs the life of each tube as well as improving the overall heat efficiency of the whole heating element. Also the firebox F—5 as shown in Figure 3 is less subject to igniting heavy accumulated gaseous vapors that sometimes roll off from stock tanks, due to its elevation. It may also be provided with a peep-hole so that the operator may inspect fire or light the burner from the ground, without having to look directly into the mouth of the firebox or place himself in that vicinity.

It will be understood, also that the present disclosure is susceptible of changes, variations, alterations and modifications apart from that shown in the structure, and which would be within the spirit of the invention and within the scope and meaning of the appended claims.

What is claimed is:

1. In an emulsion treating system of the character described, a closed emulsion treating tank having an inlet for oil and water emulsion to be treated, a heating zone above said inlet, and a baffling zone above the heating zone, said baffling zone including a plurality of inclined baffles, each having a plurality of upstanding projections having oil openings therethrough, said projections providing a plurality of water passageways between them to allow water to flow down said baffles, and a main water passageway at the ends of said baffles whereby water separated out from the emulsion is allowed to flow by gravity to the lower portion of the treating tank; said baffles being so arranged that alternate baffles or every other baffle has a layer of untreated oil held under it for a time, thereby delaying its upward flow through the hot water and providing more contact time with the water in the breaking of emulsion and dehydration of oil; a gas zone above the baffling zone, a gas off-take from the gas zone, an oil outlet from the upper portion of the baffling zone, and a water outlet from the lower portion of the treating tank below the emulsion inlet.

2. An emulsion treating system as defined in claim 1, wherein the baffles have special teat-like perforations which allow oil to be broken into many fine streams which further increases oil-water surface contact, and still furthers the process of emulsion breaking and dehydrating, said teat-like perforations projecting upwardly so that settling water removed from the oil may pass uninterruptedly between teats down the slope of the upper side of said baffles to the main water passageway.

3. A system for breaking crude petroleum and water emulsions by use of heat and water washing; comprising an emulsion treating tank having downwardly inclined baffles provided at their lower ends with aligned depending flanges forming a main drain passage, said baffles also having teat-like perforations projecting upwardly so that settling water removed from the oil may pass uninterruptedly between teats down the slope of the upper side of said baffles to the drain passage.

4. An emulsion treating apparatus comprising a closed tank having an emulsion inlet at the lower portion thereof, an oil outlet at the upper portion and a water outlet below the emulsion inlet, heating means within the tank above the emulsion inlet to assist in breaking the emulsion and to cause an upward flow within the tank, and inclined baffles located intermediate the heating means and the oil outlet, said baffles being inclined in the same direction and terminating short of the wall at their lower ends providing a continuous return passageway for separated water, said baffles having spaced perforated teat-like projections extending from their upper surfaces, arranged to provide passageways for water separated from the emulsion in passing through the baffles leading to said continuous passageway adjacent the wall, whereby the water is returned to the bottom of the tank for removal through said water outlet.

5. An emulsion treating apparatus as set forth in claim 4 wherein the lower ends of the baffle plates are provided with depending flanges.

6. In an emulsion treating system of the character described, a closed emulsion treating tank having an inlet for oil and water emulsion to be treated, a heating zone above said inlet, and a baffling zone above the heating zone, said baffling zone including a plurality of inclined baffles, each having a plurality of oil openings therethrough, and main water passageways at the lower ends of said baffles whereby water separated out from the emulsion is allowed to flow by gravity to the lower portion of the treating tank; said baffles all inclining in one direction and each having a depending flange at the lower end thereof, alternate baffles being connected at their upper ends to the wall of said tank, and the others being spaced from said wall, whereby each alternate baffle has a layer of untreated oil held under it for a time, thereby delaying its upward flow through the hot water and providing more contact time with the water in the breaking of emulsion and dehydration of oil; a gas zone above the baffling zone, a gas offtake from the gas zone, an oil outlet from the upper portion of the baffling zone, and a water outlet from the lower portion of the treating tank below the emulsion inlet.

7. In an oil emulsion treating apparatus wherein oil emulsion is passed upwardly through heating and baffling means for separation of the water from the emulsion a filtering section at the upper portion of the apparatus including spaced inclined baffles having loose filtering material in the space between successive baffles, at least one of said baffles having a conduit pipe extending into the upper adjacent filtering material, thereby insuring the introduction of oil into the midst of the filtering material.

8. An oil emulsion treating apparatus as set forth in claim 7 wherein the lower ends of the baffle plates are provided with depending flanges.

9. An emulsion treating apparatus comprising an upper heated chamber for separating water from the emulsion, a lower free water removing and heat salvaging chamber, a partition separating the upper and lower chambers, an emulsion inlet leading to the lower chamber, an oil outlet from the top of the upper chamber, a water outlet from the bottom of the lower chamber, and a perforated spreader in the partition, a portion of which extends downward into the lower chamber to delay departure of the emulsion from the lower chamber and to retain a layer of emulsion below the partition, thus providing an insulating layer between the two chambers and allowing free water to separate out in said lower chamber.

10. An emulsion treating apparatus as set forth in claim 6 wherein a filter section is provided at the lower portion of the apparatus which filters the water prior to leaving the treating system for the purpose of removing any remaining oil.

11. An emulsion treating apparatus as set forth in claim 9 wherein a water return pipe connection is provided between the lower portion of the upper chamber and the water area of the lower chamber below the emulsion layer.

12. An emulsion treating apparatus comprising a closed tank having a free water removing and heat salvaging chamber at the lower portion thereof, a heating and baffling chamber in the upper portion for separating the oil and water, a partition separating the said chambers, a perforated spreader in the partition, a portion of which extends downward into the lower chamber to delay departure of the emulsion, an emulsion inlet leading to said water removing chamber, an oil offtake from the upper portion of the tank, a water outlet leading from the bottom of the tank, means for returning hot treated water separated from the emulsion to the free water and heat salvaging chamber to supply heat to incoming untreated emulsion, and filtering means located at the extreme bottom of the treating vessel for filtering the water before leaving the treating system for the purpose of removal of any remaining oil.

13. An emulsion treating apparatus comprising a tank having an emulsion inlet pipe near the bottom thereof, means within the tank for heating the emulsion to aid in the separation of oil, water and gas, a multiple walled annular heat exchange jacket surrounding the tank above the heating means, means for passing the emulsion through the inner chamber of the jacket prior to entering the tank for the purpose of preheating the emulsion, and an offtake pipe at the upper portion of the tank connected to the outer chamber of the jacket adapted to cool the oil prior to passage to storage or use, said jacket serving as an insulator for the tank proper, as an atmospheric cooling agent for treated oil in the outer annulus of the jacket, and as a heat exchanger for untreated fluid in the inner annulus of the jacket and for treated fluid in the outer annulus thereof.

RANSOME W. ERWIN.